Figure 1:
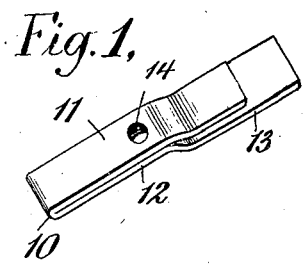

J. KENNEDY.
FASTENING DEVICE.
APPLICATION FILED FEB. 17, 1911.

991,447.

Patented May 2, 1911.

WITNESSES:

INVENTOR
Joseph Kennedy
BY
his ATTORNEYS

UNITED STATES PATENT OFFICE.

JOSEPH KENNEDY, OF NEW YORK, N. Y., ASSIGNOR TO THE CLEMENTS CO., OF NEW YORK, N. Y., A CORPORATION OF NEW YORK.

FASTENING DEVICE.

991,447.  Specification of Letters Patent.  Patented May 2, 1911.

Application filed February 17, 1911. Serial No. 609,140.

*To all whom it may concern:*

Be it known that I, JOSEPH KENNEDY, a citizen of the United States of America, and a resident of New York, county and State of New York, have invented certain new and useful Improvements in Fastening Devices, of which the following is a specification, reference being had to the accompanying drawings, forming a part thereof.

My invention relates to an improved form of nut such as is particularly adapted for employment as a fastening device in connection with sheet metal construction work.

In sheet metal work on buildings, such for instance as in sheet metal ceiling or wall construction, it is constantly required to secure objects to the sheet metal itself. Yet free access cannot be had to the rear of the sheet metal work so that an ordinary bolt and nut cannot be employed, and the sheet metal itself is too thin to be screw-threaded and so in itself to act in the nature of a nut to receive the threaded shank of a bolt.

In accordance with my present invention I provide a nut of such form that it may be readily slipped lengthwise through a circular or similar opening in sheet metal, and then caused to rest transversely against the rear face thereof so that it cannot return through the opening except when tipped and presented endwise thereto, the nut being provided with one or more extensions which in use project through the opening and engage the front face of the sheet metal, so that the nut will be held in proper position thereby to receive a bolt. Moreover by being so held in place the nut is not liable to get displaced or lost at the rear of the sheet metal work as otherwise might readily occur.

When the nut has been so placed in position, the object to be secured may be mounted in place and a bolt inserted and screwed home. The nut is then drawn tight against the rear of the sheet metal work, and so the object may be fastened very securely in position. A further advantage of the foregoing construction is that the excess length of the bolt is concealed within the metal construction. In devices where the bolt is attached in some way to sheet metal work, and projects therefrom, and the nut is applied to the projecting end, the usually somewhat unsightly nut is always in view, and the bolt must be of great predetermined accuracy in length, or the end thereof will project and further add to the unsightliness of the work.

In order that my invention may be fully understood, I will now proceed to describe certain embodiments thereof, having reference to the accompanying drawings illustrating the same, and will then point out the novel features in claims.

Figure 2:
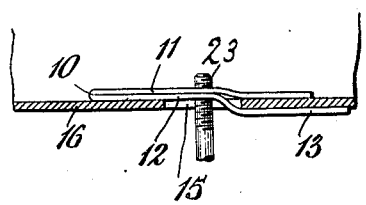
Figure 3:
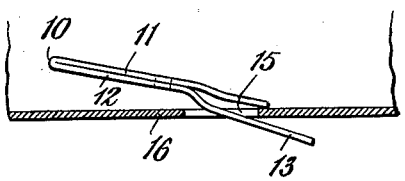
Figure 4:
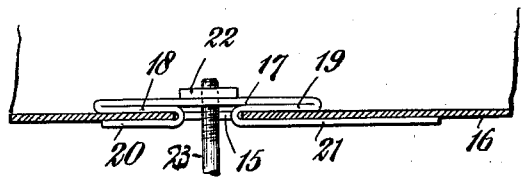
Figure 5:
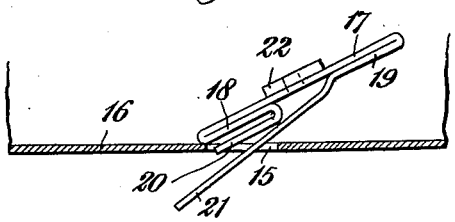
Figure 6:
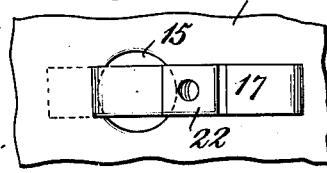

In the drawings: Figure 1 is a view in perspective of one form of nut constructed in accordance with my invention. Fig. 2 is a view in side elevation thereof showing the same as applied to a sheet metal construction, and showing also a portion of a bolt for connection therewith. Fig. 3 is a view similar to Fig. 2 showing the nut as being in the act of being mounted in position. Fig. 4 is a view similar to Fig. 2 showing a somewhat different form of nut. Fig. 5 is a view showing a nut of the form illustrated in Fig. 4 as being mounted in place. Fig. 6 is a top view of the parts in the position shown in Fig. 5.

The nut illustrated in the example of my invention shown in Figs. 1 to 3 inclusive is composed of a flat strip of metal bent backward upon itself at a point 10 so that it includes two parts 11 and 12 which face toward each other. The free end 13 of the part 12 is offset from that portion of the part 11 which is adjacent thereto, whereby the adjacent faces of such portions of the part 11 and the offset portion 13 are spaced apart from each other. The distance apart is approximately equal to the thickness of the sheet metal construction work with which the nut is to be employed. Intermediate its ends the nut is provided with a tapped opening 14 as shown. When this nut is employed in use it is grasped by the extremity of the offset portion 13, such extremity being preferably made of a length suitable for this purpose, and the nut is inserted lengthwise through an opening 15 in the sheet metal work 16. The end of the nut opposite to the end by which it is grasped, *i. e.*, the end marked 10 in the drawings, is inserted first and thereafter all of the nut is inserted except the extreme end of the part 13 by which the nut is grasped. After the free end of the part 11 has passed through the opening the nut is drawn over to the right as shown in Fig. 3, until it assumes the position shown in Fig. 2. At this time the under face of the free end of the part 11 rests upon the rear face of the sheet metal work 16 upon one side of the opening 15, while the under side of the doubled-over portion at the other end of the nut rests upon the rear face of the sheet metal at the diametrically opposite side of the said hole. The upper face of the offset portion 13 rests, however, against the front face of the sheet metal work as is clearly shown in Fig. 2, this offset portion thereby tending to hold the nut in place ready for the insertion of a bolt therein, and to prevent the accidental loss or displacement of the nut should the bolt be thereafter removed. To secure an object to the sheet metal work it is only necessary to pass a bolt 23 through the object, apply the end to the threaded orifice 14 in the nut, and then to screw the bolt home.

In Figs. 4, 5, and 6 I have shown a somewhat different form of nut in which the main body or central part 17 has its two end portions 18—19 bent backward upon itself and then again backward so as to constitute two offset extensions 20—21 (see Fig. 4). The extension 21 is of flexible material and the final bending to constitute the offset extension is accomplished after the nut is in place. In Fig. 5 the nut is shown as being inserted into place. At this time the nut is grasped by the extremity of the part 21 and it is inserted as shown, the nut thereafter being moved to the left as viewed in Fig. 5, so that it will lie in proper position with respect to the opening 15, the sheet metal lying between the offset portion 20 and the part 18 upon one side of the opening 15, the part 21 being thereafter manually bent around from the relative position in which it is shown in Fig. 5 to the position in which it is shown in Fig. 4. The two extensions thus employed act to hold the nut securely in place against accidental movement as will be well understood. In this form I have shown the central portion 22 of the nut as thicker than the remaining portion, the extra thickness being employed for the purpose of providing enough stock to properly receive the threads for co-action with a bolt to be employed therewith.

What I claim is:

1. A nut composed of a flat strip of metal bent backward upon itself, the adjacent side faces whereof are relatively offset toward one end, the middle portion having a tapped orifice for receiving a bolt.

2. A nut having greater length than width whereby it may be inserted lengthwise throught a circular opening and the extremities thereafter permitted to rest upon surfaces adjacent the opening and to the rear thereof, the said nut being provided with an extension offset from the main portion and substantially parallel thereto, whereby in use the said extension may project through the said opening and the adjacent face of the said offset portion rest against a surface opposite to that against which the main portion of the nut rests.

3. A nut having greater length than width whereby it may be inserted lengthwise through a circular opening and the extremities thereafter permitted to rest upon surfaces adjacent the opening and to the rear thereof, the said nut being provided with a flexible extension projecting therefrom intermediate its ends, whereby in use the said extension may project through the said opening to the front thereof, and be bent over in front to hold the nut in place.

4. A nut having greater length than width whereby it may be inserted lengthwise through a circular opening and the extremities thereafter permitted to rest upon surfaces adjacent the opening and to the rear thereof, the said nut being provided with an extension offset from the main portion and substantially parallel thereto, whereby in use the said extension may project through the said opening and the adjacent face of the said offset portion rest against a surface opposite to that against which the main portion of the nut rests, and the said nut also being provided with a flexible extension projecting therefrom intermediate its ends, whereby in use the said extension may also project through the said opening, and be bent over into line with the said offset portion, to also engage an opposite surface, and so to combine with the first said extension to hold the nut in place.

JOSEPH KENNEDY.

Witnesses:
C. V. HEMSTREET,
HORATIO O'KEEFE.